(12) United States Patent
Chen et al.

(10) Patent No.: US 11,416,781 B2
(45) Date of Patent: Aug. 16, 2022

(54) IMAGE PROCESSING METHOD AND APPARATUS, AND COMPUTER-READABLE MEDIUM, AND ELECTRONIC DEVICE

(71) Applicant: TENCENT TECHNOLOGY (SHENZHEN) COMPANY LIMITED, Guangdong (CN)

(72) Inventors: Wei Dong Chen, Shenzhen (CN); Baoyuan Wu, Shenzhen (CN); Wei Liu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 201 days.

(21) Appl. No.: 16/923,325

(22) Filed: Jul. 8, 2020

(65) Prior Publication Data

US 2020/0342360 A1 Oct. 29, 2020

Related U.S. Application Data

(63) Continuation of application No. PCT/CN2019/086384, filed on May 10, 2019.

(30) Foreign Application Priority Data

Jun. 8, 2018 (CN) .......................... 201810588686.9

(51) Int. Cl.
*G06N 20/10* (2019.01)
*G06F 17/18* (2006.01)
(Continued)

(52) U.S. Cl.
CPC ............. *G06N 20/10* (2019.01); *G06F 17/18* (2013.01); *G06K 9/6232* (2013.01); *G06T 3/60* (2013.01); *G06T 11/60* (2013.01)

(58) Field of Classification Search
CPC .... G06N 20/10; G06N 3/0481; G06N 3/0454; G06N 3/08; G06F 17/18; G06K 9/6232;
(Continued)

(56) References Cited

U.S. PATENT DOCUMENTS

2018/0137388 A1 5/2018 Kim et al.
2019/0108441 A1* 4/2019 Thibault ................ G06N 20/00

FOREIGN PATENT DOCUMENTS

CN 106778682 A 5/2017
CN 107527044 A 12/2017
(Continued)

OTHER PUBLICATIONS

Take it in your stride, Kong et al, 2017; https://arxiv.org/pdf/1712.02502.pdf (Year: 2017).*
(Continued)

*Primary Examiner* — Jianxun Yang
(74) *Attorney, Agent, or Firm* — Sughrue Mion, PLLC

(57) ABSTRACT

An image processing method includes: obtaining a target image; performing feature extraction on the target image based on a residual network, to obtain image feature information; and performing recognition processing on the target image according to the image feature information. The residual network includes a plurality of residual blocks that are successively connected, each of the residual blocks including a convolution branch and a residual branch, a size of a convolution kernel of a first convolutional layer in the convolution branch being less than a size of a convolution kernel of a second convolutional layer located after the first convolutional layer, and a convolution stride of the second convolutional layer being greater than a convolution stride of the first convolutional layer and less than a width of the convolution kernel of the second convolutional layer.

19 Claims, 9 Drawing Sheets

(51) Int. Cl.
  *G06K 9/62* (2022.01)
  *G06T 3/60* (2006.01)
  *G06T 11/60* (2006.01)

(58) Field of Classification Search
  CPC ......... G06K 9/6273; G06T 3/60; G06T 11/60;
      G06V 10/454; G06V 10/82; G06V 10/40
  See application file for complete search history.

(56) References Cited

FOREIGN PATENT DOCUMENTS

| CN | 107871105 A | 4/2018 |
|---|---|---|
| CN | 108108499 A | 6/2018 |

OTHER PUBLICATIONS

Written Opinion of the International Searching Authority dated Jul. 30, 2019 in Application No. PCT/CN2019/086384.
Kaiming He et al., "Deep Residual Learning for Image Recognition", arXiv:1512.03385v1 [cs.CV], Dec. 10, 2015.
International Search Report for PCT/CN2019/086384, dated Jul. 30, 2019.

\* cited by examiner

US 11,416,781 B2

IMAGE PROCESSING METHOD AND APPARATUS, AND COMPUTER-READABLE MEDIUM, AND ELECTRONIC DEVICE

CROSS-REFERENCE TO RELATED APPLICATION(S)

This application is a bypass continuation application of International Application No. PCT/CN2019/086384, filed on May 10, 2019, which claims priority to Chinese Patent Application No. 201810588686.9, entitled "IMAGE PROCESSING METHOD AND APPARATUS, COMPUTER-READABLE MEDIUM, AND ELECTRONIC DEVICE" and filed with the China National Intellectual Property Administration on Jun. 8, 2018, the disclosures of which are incorporated herein by reference in their entireties.

FIELD

The disclosure relates to the field of computer technologies, and in particular, to an image processing method, an image processing apparatus, a computer-readable medium, and an electronic device.

BACKGROUND

A neural network is a mathematical model or a calculation module imitating a structure and a function of a biological neural network, and is widely applied to an image processing procedure, for example, being used for image recognition. A residual neural network (ResNet) is a neural network proposed by He Kaiming et al., "Deep Residual Learning for Image Recognition", 2015.

The information partially disclosed in the Background is only used for enhancing understanding of the background of the disclosure, and therefore may include information not constituting the related art known by a person of ordinary skill in the art.

SUMMARY

Example embodiments of the disclosure provide an image processing method, an image processing apparatus, a computer-readable medium, and an electronic device, that at least ensure that a residual network may extract an accurate image feature from an image to some extent, and thereby improve the accuracy of image recognition.

According to an aspect of example embodiments of the disclosure, an image processing method is provided, performed by an electronic device, the method including: obtaining a target image; performing feature extraction on the target image based on a residual network, to obtain image feature information, the residual network including a plurality of residual blocks that are successively connected, each of the residual blocks including a convolution branch and a residual branch, a size of a convolution kernel of a first convolutional layer in the convolution branch being less than a size of a convolution kernel of a second convolutional layer located after the first convolutional layer, and a convolution stride of the second convolutional layer being greater than a convolution stride of the first convolutional layer and less than a width of the convolution kernel of the second convolutional layer; and performing recognition processing on the target image based on the image feature information.

According to an aspect of example embodiments of the disclosure, an image processing apparatus is provided, including: a first obtaining unit, configured to obtain a target image; a first processing unit, configured to perform feature extraction on the target image based on a residual network, to obtain image feature information, the residual network including a plurality of residual blocks that are successively connected, each of the residual blocks including a convolution branch and a residual branch, a size of a convolution kernel of a first convolutional layer in the convolution branch being less than a size of a convolution kernel of a second convolutional layer located after the first convolutional layer, and a convolution stride of the second convolutional layer being greater than a convolution stride of the first convolutional layer and less than a width of the convolution kernel of the second convolutional layer; and a second processing unit, configured to perform recognition processing on the target image according to the image feature information.

According to one aspect of the embodiments of the disclosure, a non-transitory computer-readable medium is provided, storing a computer program, the computer program, when executed by at least one processor, causing the at least one processor to perform the image processing method described in the foregoing embodiments.

According to one aspect of the embodiments of the disclosure, an electronic device is provided, including: one or more processors; and a storage apparatus, configured to store one or more programs, the one or more programs, when executed by the one or more processors, causing the one or more processors to implement the image processing method described in the foregoing embodiments.

It is to be understood that the foregoing general descriptions and the following detailed descriptions are merely for illustrative and explanatory purposes, and cannot limit the disclosure.

BRIEF DESCRIPTION OF THE DRAWINGS

The accompanying drawings, which are incorporated herein and constitute a part of this specification, illustrate example embodiments consistent with the disclosure and, together with the specification, serve to explain the principles of the disclosure. It should be understood that the accompanying drawings in the following descriptions are merely some example embodiments of the disclosure, and all other embodiments that may be obtained by a person of ordinary skill in the art based on the embodiments of the disclosure described herein without creative efforts shall fall within the protection scope of the disclosure.

DETAILED DESCRIPTION

Example embodiments are comprehensively described with reference to the accompanying drawings. However, the example embodiments may be implemented in multiple forms, and are not to be understood as being limited to examples described herein. Conversely, the example embodiments are provided to make the disclosure more comprehensive and complete, and comprehensively convey the inventive concept of the disclosure.

In addition, the described features, structures or characteristics may be combined in one or more embodiments in any appropriate manner. In the following descriptions, specific details are provided to give a comprehensive understanding of the example embodiments of the disclosure. However, it is to be appreciated by a person skilled in the art that, the technical solutions in the disclosure may be implemented without one or more of the particular details, or another method, element, apparatus, or operation may be used. In other cases, well-known structures, apparatuses, implementations or operations are not shown or described in detail, in order not to obscure aspects of the disclosure.

The block diagrams shown in the accompanying drawings are merely functional entities and do not necessarily correspond to a physically independent entity. That is, the functional entities may be implemented in a software form, or the functional entities may be implemented in one or more hardware modules or integrated circuits, or the functional entities may be implemented in different networks and/or processor apparatuses and/or microcontroller apparatuses.

The flowcharts shown in the accompanying drawings are merely example descriptions, and do not necessarily include all content and operations/operations, or are not necessarily executed in the described order. For example, some operations/operations may be alternatively decomposed, and some operations/operations may be combined or partially combined. Therefore, an actual execution sequence may be changed according to an example embodiment.

Figure 1:
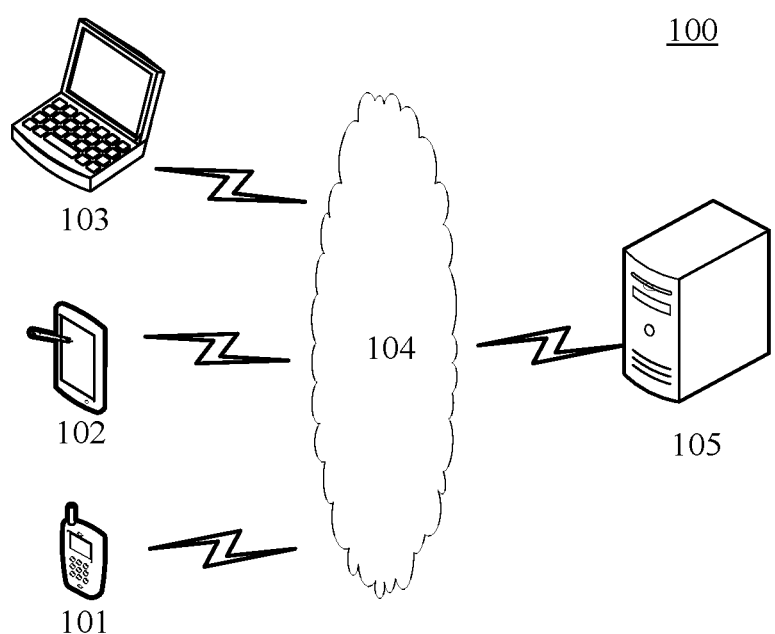
FIG. 1 shows a schematic diagram of an example system architecture to which an image processing method or an image processing apparatus is applicable according to an example embodiment of the disclosure.

FIG. 1 shows a schematic diagram of an example system architecture 100 to which an image processing method or an image processing apparatus is applicable according to an example embodiment of the disclosure.

As shown in FIG. 1, the system architecture 100 may include one or more of terminal devices 101, 102, and 103, a network 104, and a server 105. The network 104 is used for providing a communication link between the terminal devices 101, 102, and 103 and the server 105. The network 104 may include various connection types, for example, a wired communication link and a wireless communication link.

The quantities of the terminal devices, the network, and the server in FIG. 1 are merely examples. According to implementation requirements, any quantity of terminal devices, networks, and servers may be included. For example, the server 105 may be a server cluster that includes a plurality of servers.

A user may interact with the server 105 through the network 104 by using the terminal devices 101, 102, and 103, to receive or send a message, or the like. The terminal devices 101, 102, and 103 may be various electronic devices having a display screen, and include, but are not limited to, a smartphone, a tablet computer, a portable computer, a desktop computer, and the like.

The server 105 may be a server that provides various services. For example, the user acquires a to-be-recognized image by using the terminal device 103 (or may be the terminal device 101 or 102), and then uploads the image to the server 105. After receiving the image, the server 105 may perform feature extraction on the image based on a residual network (for example, a residual neural network (ResNet)), to obtain image feature information, and further recognize the image based on the image feature information. The residual network used by the server 105 for performing feature extraction includes a plurality of residual blocks that are successively connected, each of the residual blocks including a convolution branch and a residual branch, a size of a convolution kernel of a first convolutional layer in the convolution branch being less than a size of a convolution kernel of a second convolutional layer located after the first convolutional layer, and a convolution stride of the second convolutional layer being greater than a convolution stride of the first convolutional layer and less than a width of the convolution kernel of the second convolutional layer. For example, the size of the convolution kernel of the first convolutional layer is 1×1 pixel, the convolution stride of the first convolutional layer is 1 pixel, the size of the convolution kernel of the second convolutional layer is 3-3 pixels, and the convolution stride of the second convolutional layer is 2 pixels, during a convolution operation. Based on this configuration, it is ensured that downsampling processing can be implemented through the second convolutional layer, and it can be ensured that no feature point is skipped (that is, all pixels in a feature map are considered), thereby further ensuring that there is no loss in the representation capability of a feature network. Accordingly, the accuracy of image feature extraction is ensured, and the accuracy of image recognition is improved.

The image processing method provided in this embodiment of the disclosure is generally performed by the server 105, and correspondingly, the image processing apparatus is generally disposed in the server 105. However, in other embodiments of the disclosure, the terminal may alternatively have a function similar to that of the server, to perform the image processing method provided in this embodiment of the disclosure.

Figure 2:
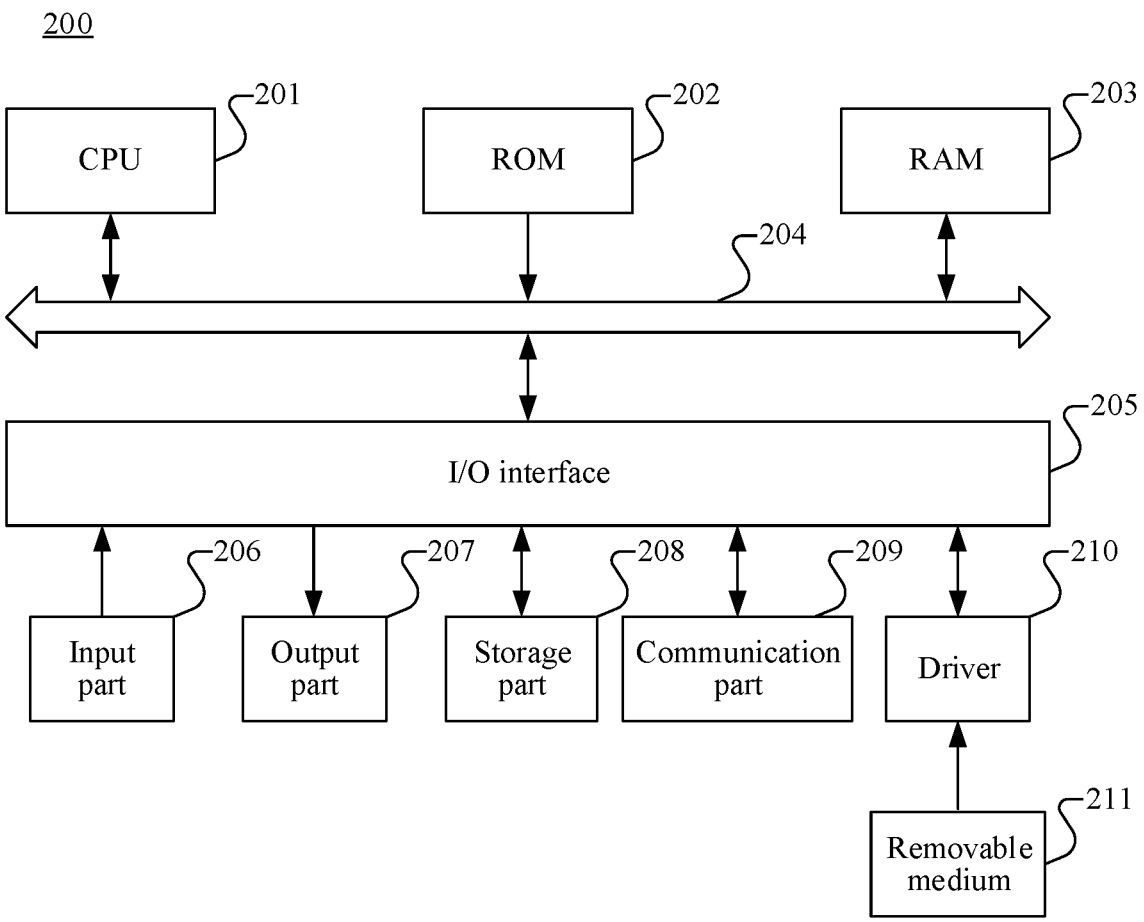
FIG. 2 shows a schematic structural diagram of a computer system that implements an electronic device according to an example embodiment of the disclosure.

FIG. 2 shows a schematic structural diagram of a computer system that implements an electronic device according to an example embodiment of the disclosure.

A computer system 200 of the electronic device shown in FIG. 2 is merely an example, and is not be construed as any limitation on functions and use scopes of the embodiments of the disclosure.

As shown in FIG. 2, the computer system 200 includes a central processing unit (CPU) 201, which may perform various functions and processing according to a program stored in a read-only memory (ROM) 202 or a program loaded from a storage part 208 into a random access memory (RAM) 203. The RAM 203 further stores various programs and data required to operate the computer system 200. The CPU 201, the ROM 202, and the RAM 203 are connected through a bus 204. An input/output (I/O) interface 205 is also connected to the bus 204.

The I/O interface 205 is connected to the following parts: an input part 206 including a keyboard, a mouse, and the like: an output part 207 including a cathode ray tube (CRT), a liquid crystal display (LCD), a speaker, and the like; a storage part 208 including a hard disk and the like; and a communication part 209 including a network interface card such as a local area network (LAN) card or a modem. The above examples of the input part 206, the output part 207, and the storage part 208 are given for illustrative purposes only and are not limiting. The communication part 209 performs communication processing through a network such as the Internet. A driver 210 is also connected to the I/O interface 205 as required. A removable medium 211 such as a magnetic disk, an optical disc, a magneto-optical disk, or a semiconductor memory is mounted on the driver 210 as required, so that a computer program read from the removable medium 211 is installed into the storage part 208 as required.

Particularly, according to this embodiment of the disclosure, the processes described in the following with reference to the flowcharts may be implemented as computer software programs. For example, this embodiment of the disclosure includes a computer program product, which includes a computer program carried in a computer-readable medium. The computer program includes program code used for performing the methods shown in the flowcharts. In such an example embodiment, by using the communication part 209, the computer program may be downloaded and installed from a network, and/or installed from the removable medium 211. When the computer program is executed by the CPU 201, various functions defined in the system of the disclosure are executed.

The computer-readable medium in the disclosure may be a computer-readable signal medium or a non-transitory computer-readable storage medium or any combination thereof. The non-transitory computer-readable storage medium may be, for example, but not limited to, an electric, magnetic, optical, electromagnetic, infrared, or semi-conductive system, apparatus, or device, or any combination thereof. More specific examples of the computer-readable storage medium may include, but are not limited to: an electrical connection having one or more wires, a portable computer magnetic disk, a hard disk, a RAM, a RO, an erasable programmable read-only memory (EPROM or flash memory), an optical fiber, a compact disk read-only memory (CD-ROM), an optical storage device, a magnetic storage device, or any appropriate combination thereof. In the disclosure, the computer-readable storage medium may be any tangible medium including or storing a program, and the program may be used by or in combination with an instruction execution system, apparatus, or device. In the disclosure, the computer-readable signal medium may include a data signal propagated in a baseband or as part of a carrier, and stores computer-readable program code. The propagated data signal may be in a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may be configured to send, propagate, or transmit a program used by or in combination with an instruction execution system, apparatus, or device. The program code included in the computer-readable medium may be transmitted by using any suitable medium, including, but not limited to, wireless and wired transmission and the like, or any suitable combination thereof.

The flowcharts and block diagrams in the accompanying drawings show architectures, functions, and operations that may be implemented for the system, the method, and the computer program product according to the embodiments of the disclosure. Each block in a flowchart or a block diagram may represent one module, one program segment, or a part of code. The module, the program segment, or the part of code includes one or more executable instructions for implementing a specified logical function. In some implementations used as substitutes, functions annotated in blocks may alternatively occur in a sequence different from sequences annotated in the accompanying drawings. For example, two blocks shown in succession may be performed substantially in parallel, or the two blocks may be performed in a reverse sequence. This is determined by an involved function. Each block in the block diagram and/or the flowchart and a combination of blocks in the block diagram and/or the flowchart may be implemented by using a dedicated hardware-based system configured to perform a specified function or operation, or may be implemented by using a combination of dedicated hardware and a computer instruction.

Involved units described in the embodiments of the disclosure may be implemented in a software manner, or may be implemented in a hardware manner. The units described may alternatively be disposed in a processor. Names of these units do not constitute a limitation on the units in some case.

As another aspect, the disclosure further provides a computer-readable medium, including a non-transitory computer-readable storage medium. The computer-readable medium may be included in the electronic device described in the foregoing embodiments; or may be exist alone and is not mounted in the electronic device. The computer-readable medium carries one or more programs, and the one or more programs, when executed by the electronic device, cause the electronic device to implement the method described in the following embodiments. For example, the electronic device may implement operations shown in FIG. 3, and FIG. 6 to FIG. 8.

The following describes implementation details of the technical solutions of the embodiments of the disclosure.

Figure 3:
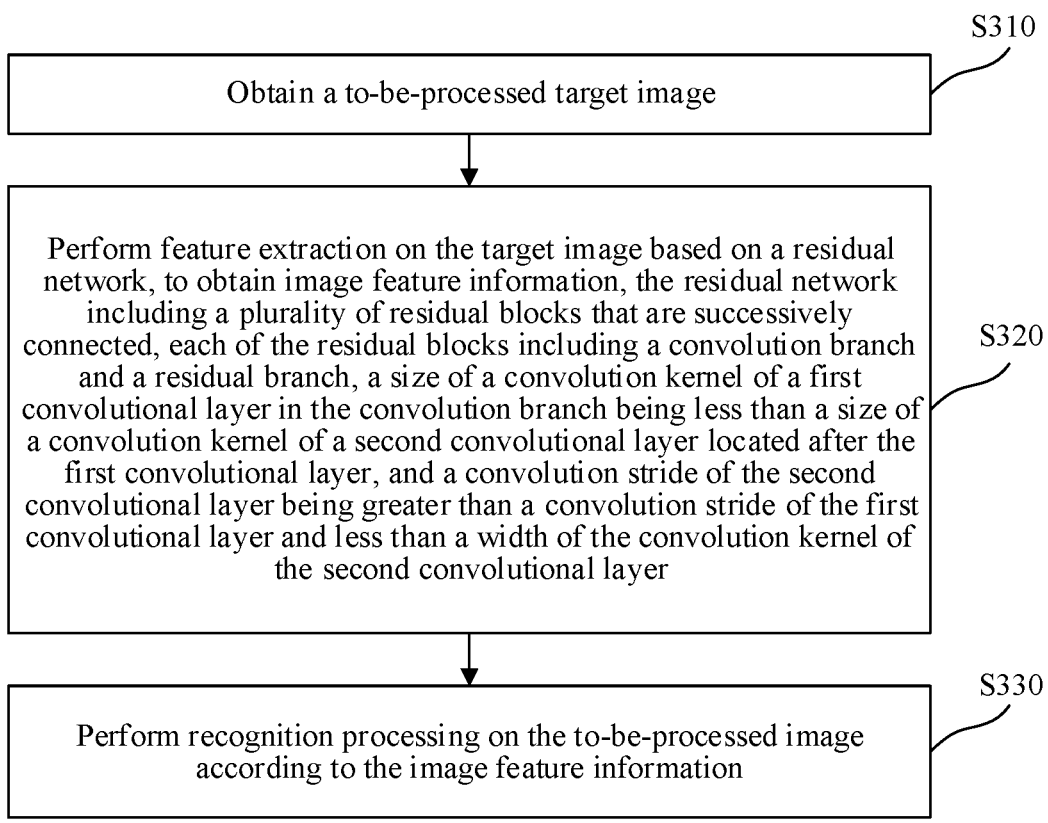
FIG. 3 schematically shows a flowchart of an image processing method according to an example embodiment of the disclosure.

FIG. 3 schematically shows a flowchart of an image processing method according to an example embodiment of the disclosure. The image processing method is applicable to the electronic device described in the foregoing embodiments. Referring to FIG. 3, the image processing method includes at least operation S310 to operation S330, and details are as follows:

Operation S310: Obtain a to-be-processed target image.

In an example embodiment of the disclosure, the to-be-processed target image may be an image on which visual processing needs to be performed, for example, an image on which object recognition needs to be performed.

Operation S320: Perform feature extraction on the target image based on a residual network, to obtain image feature information, the residual network including a plurality of residual blocks that are successively connected, each of the residual blocks including a convolution branch and a residual branch, a size of a convolution kernel of a first convolutional layer in the convolution branch being less than a size of a convolution kernel of a second convolutional layer located after the first convolutional layer, and a convolution stride of the second convolutional layer being greater than a convolution stride of the first convolutional layer and less than a width of the convolution kernel of the second convolutional layer. The residual branch in the residual block points from an input of the convolution branch to an output of the convolution branch.

In this embodiment of the disclosure, the "block", the "branch", the "layer", and the "stage" that are used for describing the residual network represent various processing procedures or operations. The term "successively connected" represents that the processing procedures or operations are connected with each other in sequential order.

According to this embodiment of the disclosure, the convolutional layer also means performing convolution processing or operation on the to-be-processed target image. Convolution is a mathematical operator generating a third function through two functions f and g. According to this embodiment of the disclosure, the target image is represented by using, for example, the function f, and the convolution kernel is the function g. The function f and the function g may be three-dimensional discrete matrices, and the generated third function may also be a three-dimensional matrix. For example, the target image is represented in a format of a (H, W. C)) three-dimensional matrix, where H and W are respectively a height and a width of the target image, which are used for representing a resolution or a size of the target image, and C represents a quantity of channels of the target image. For example, a color image includes three channels (R, G, B), that is, C=3. In the three-dimensional matrix used for representing the target image, for example, elements in a first dimension are pixels of all rows of the target image, elements in a second dimension are pixels of all columns of the target image, and elements in a third dimension are pixels of all channels of the target image. Each pixel in the target image is used as a description unit, and pixel values of the three channels are recorded.

The convolution kernel is also referred to as a filter matrix. The convolution kernel extracts features of different locations of the target image through a manner of "sliding window", and an obtained result is a feature map. Pixels on the feature map are feature points. The convolution stride is a quantity of pixels by which a center of the convolution kernel moves on the target image each time. For example, the inputted target image is a grayscale image of 5×5 pixels, the convolution kernel is a matrix of 3×3 pixels, and the convolution stride is 1. The convolution procedure is: moving the matrix of 3×3 pixels from the upper left corner to the lower right corner on the image of 5×5 pixels, where 1 pixel is moved each time of a convolution operation. Each time the convolution kernel matrix moves, dot multiplication is performed on the convolution kernel matrix and a corresponding feature point of the target image, and summation is performed on products of dot multiplication, to form a new matrix. The convolution stride may implement a downsampling function. Through convolution calculation, a resolution of the outputted image becomes much less than a resolution of the inputted target image.

In an example embodiment of the disclosure, the residual network may be a deep residual network. The residual network further includes an initial convolutional layer located before the plurality of residual blocks, and an output of the initial convolutional layer is used as an input of the first residual block in the plurality of residual blocks. In this embodiment, because the second convolutional layer in the residual block may already implement downsampling processing, some pooling layers located before the residual block in the residual network may be removed, thereby simplifying the structure of the residual network.

In an example embodiment of the disclosure, the plurality of residual blocks in the residual network form a plurality of convolution stages, and the residual branch included in each residual block in each of the convolution stages includes a batch normalization processing layer and a target convolutional layer that are successively connected.

In this embodiment, for a residual block, if sizes (including sizes, channels, and the like) of an input and an output of the residual block are the same, the residual branch may be an identical mapping. However, if the sizes of the input and the output are different, the input and the output need to be mapped to the same size through a convolution operation. According to this embodiment of the disclosure, in the first residual block in each convolution stage, sizes of an input and an output of the residual block need to be ensured to be consistent through a residual branch of a nonidentical mapping (that is, adding a convolutional layer). Because there is no offset item in the convolution operation of the convolutional layer, a batch normalization (BN) layer may be added before the convolutional layer, to add the offset item, and further, it may be ensured that an optimal processing effect is achieved. The BN layer means performing normalization processing on a feature map generated by performing convolution processing on a plurality of samples (e.g., target images). Specifically, for feature points generated by each sample, a distribution of the feature points is normalized into a distribution whose average value is 0 and variance is 1 through a manner of subtracting the average value and dividing the variance.

Referring to FIG. 3, in operation S330, recognition processing is performed on the to-be-processed target image according to the image feature information.

In the technical solution of the embodiment shown in FIG. 3, when the convolutional layer in the residual block performs convolution operation, it is ensured that downsampling processing is implemented through the second convolutional layer, and it may be ensured that no feature point is skipped, thereby further ensuring that no loss occurs in the representation capability of a feature network. Accordingly, the accuracy of image feature extraction may be ensured, and image recognition accuracy may be improved.

Figure 4:
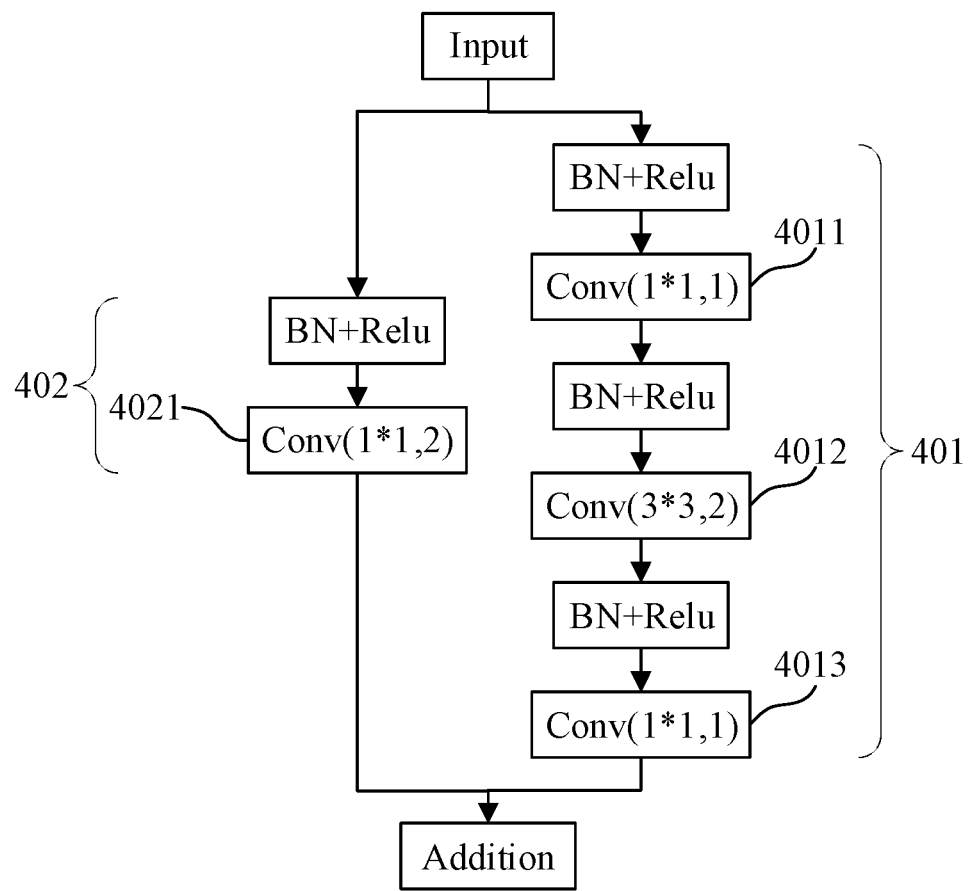
FIG. 4 shows a schematic structural diagram of the first residual block in each convolution stage of a residual network according to an example embodiment of the disclosure.

Based on the structure of the residual network introduced in the foregoing embodiments, FIG. 4 shows a schematic structural diagram of the first residual block in each convolution stage of a residual network according to an example embodiment of the disclosure. The first residual block specifically includes: a convolution branch 401 and a residual branch 402. The residual branch 402 points from an input of the convolution branch 401 to an output of the convolution branch 401.

The convolution branch 401 includes a first convolutional layer 4011, a second convolutional layer 4012, and a third convolutional layer 4013. A BN layer is set before each of the first convolutional layer 4011, the second convolutional layer 4012, and the third convolutional layer 4013. In addition, after being processed through the BN layers, the first convolutional layer 4011, the second convolutional layer 4012, and the third convolutional layer 4013 are all processed through a rectified linear unit (Relu). When a quantity of convolutional layers increases, the representation capability of the residual network may be improved, and an effect on a specific application may become better. For example, in an image recognition application, an object in a target image may be more accurately recognized. In an example embodiment, a size of a convolution kernel of the first convolutional layer 4011 is 1×1 pixel, and a convolution stride of the first convolutional layer 4011 is 1 pixel; a size of a convolution kernel of the second convolutional layer 4012 is 3-3 pixels, and a convolution stride of the second convolutional layer 4012 is 2 pixels; and a size of a convolution kernel of the third convolutional layer 4013 is 1-1 pixel, and a convolution stride of the third convolutional layer 4013 is 1 pixel. Because the second convolutional layer 4012 may implement downsampling processing, and may ensure that no feature point is skipped, the residual block of this embodiment of the disclosure may ensure that no loss occurs in the representation capability of the feature network.

In some residual network structures, in the convolution branch, the size of the convolution kernel of the first convolutional layer is 1×1 pixel, the convolution stride of the first convolutional layer is 2 pixels, the size of the convolution kernel of the second convolutional layer is 3×3 pixels, and the convolution stride of the second convolutional layer is 1 pixel. In this case, when the first convolutional layer performs convolution operation, a feature point is skipped between two convolution procedures, leading to a loss in the feature network. However, by using the residual network of this embodiment of the disclosure, the size of the convolution kernel of the first convolutional layer in the convolution branch included in the residual block is less than the size of the convolution kernel of the second convolutional layer located after the first convolutional layer, and the convolution stride of the second convolutional layer is greater than the convolution stride of the first convolutional layer and less than a width of the convolution kernel of the second convolutional layer. Therefore, when the convolutional layer in the residual block performs convolution operation, it is ensured that downsampling processing is implemented through the second convolutional layer, and it may be ensured that no feature point is skipped, thereby further ensuring that no loss occurs in the representation capability of a feature network. Accordingly, the accuracy of image feature extraction may be ensured, and image recognition accuracy may be improved.

A calculation formula of the Relu is, for example:

$y=\max(0,x)$.

x is a feature point on the inputted feature map, and y is a corresponding feature point on the outputted feature map. The Relu introduces a nonlinear feature to a system, on which a linear calculation operation is performed, in the convolutional layer.

The residual branch 402 includes a convolutional layer 4021 and a BN layer set before the convolutional layer 4021. In addition, after processing is performed through the BN layer, processing is performed through a Relu function.

An addition calculation is performed on outputs of the convolution branch 401 and the residual branch 402 in terms of elements, to obtain an output of each residual block.

Figure 5:
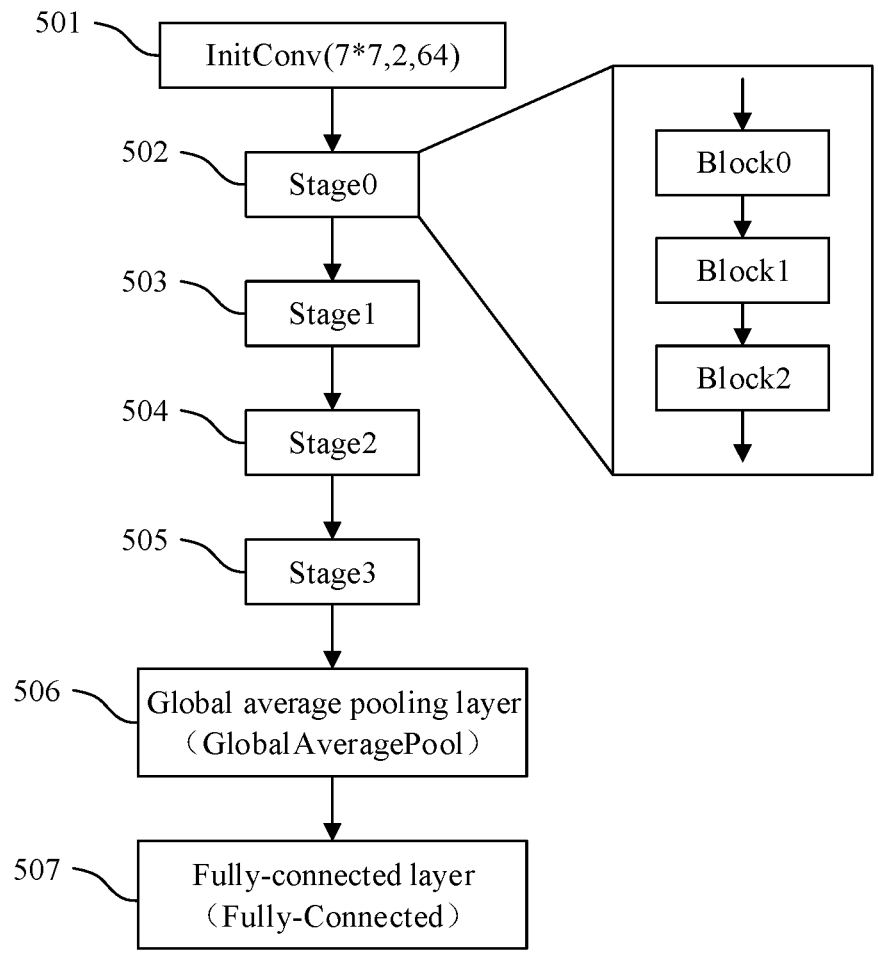
FIG. 5 shows a schematic structural diagram of a residual network according to an example embodiment of the disclosure.

FIG. 5 shows a schematic structural diagram of a residual network according to an example embodiment of the disclosure. The structure includes: an initial convolutional layer 501, a convolution stage 502, a convolution stage 503, a convolution stage 504, a convolution stage 505, a global average pooling layer 506, and a fully-connected layer 507 that are successively connected. A size of a convolution kernel of the initial convolutional layer 501 is 7×7 pixels, a convolution stride of the initial convolutional layer 501 is 2 pixels, and a quantity of channels of the initial convolutional layer 501 is 64. Each of the convolution stage 502, the convolution stage 503, the convolution stage 504, and the convolution stage 505 includes a plurality of residual blocks. Quantities of the residual blocks included in different convolution stages may be different. For example, in a ResNet 101, the convolution stage 502 includes 3 residual blocks, the convolution stage 503 includes 4 residual blocks, the convolution stage 504 includes 23 residual blocks, and the convolution stage 505 includes 4 residual blocks. A structure of the first residual block in each convolution stage is shown in FIG. 4. Residual branches in other residual blocks are identical mappings. The convolution branch may be the same as the convolution branch 401 shown in FIG. 4.

It can be seen from the structure of the residual network shown in FIG. 4 and FIG. 5 that, after the initial convolutional layer 501 of the residual network in this embodiment of the disclosure, some maximum pooling layers in the residual network are removed, and a downsampling procedure is arranged into the first convolution stage, that is, the convolution stage 502, and specifically, is arranged into the second convolutional layer 4012 of the first residual block of the convolution stage 502. In each residual block, the downsampling procedure is arranged into a second convolutional layer, where a size of a convolution kernel of the second convolutional layer is 3×3 pixels, to further ensure that no feature point is skipped in the downsampling procedure, and ensure that no loss occurs in the representation capability of the feature network. In addition, the BN layer is not only added to the convolution branch, but also added to a residual branch of a nonidentical mapping. In this way, an offset item may be added before the convolutional layer through the BN layer, and further it may be ensured that an optimal processing effect is achieved.

Figure 6:
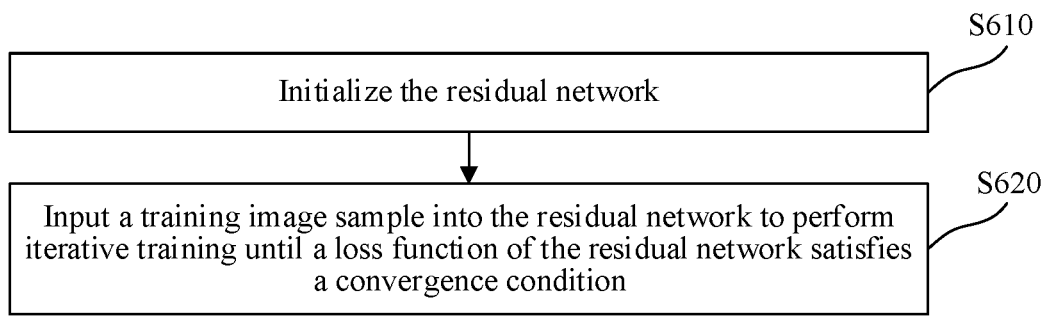
FIG. 6 shows a flowchart of a method for training a residual network according to an example embodiment of the disclosure.

Based on the structure of the residual network introduced in the foregoing embodiments, an example embodiment of the disclosure further provides a solution for training the residual network. Specifically, as shown in FIG. 6, a method for training the residual network according to this embodiment of the disclosure includes the following operations:

Operation S610: Initialize the residual network.

Operation S620: Input a training image sample into the residual network to perform iterative training until a loss function of the residual network satisfies a convergence condition.

In the field of computer neural science, a loss function or a cost function is a function of mapping an event (e.g., an element in a sample space) to a real number representing opportunity costs related to the event, to visually represent associations between some "costs" and events. An objective of an optimization problem is to minimize a loss function. A target function may be a loss function or a negative value of a loss function. When a target function is a negative value of a loss function, a value of the target function needs to be maximized. A function of the loss function is to estimate a parameter.

In an example embodiment of the disclosure, when iterative training is performed on the residual network, a Momentum-Stochastic Gradient Descent (SGD) optimization method may be used for training, and a distributed training framework may be used to improve a training rate. For example, training may be performed by using a hardware configuration of 4 machines and 32 graphics cards. Specific hyperparameters for training are shown in FIG. 1, where epoch is iterations used for learning all training images once according to a current batch size.

TABLE 1

| Hyperparameter | Value |
| --- | --- |
| Batch Size | 64 × 4 × 32 |
| Learning Rate | 0.8 |
| Learning Rate Decay Coefficient | 0.1 |
| Learning Rate Decay Interval | 30 epoch |
| Learning Rate Warmup | 0.1 |
| Learning Rate Warmup Decay Coefficient | 0.1 |
| Learning Rate Warmup Decay Interval | 1 epoch |
| Coefficient Of Weight Regular Term | 1e−4 |

In an example embodiment of the disclosure, the BN layer of the residual network includes learnable parameters, and the learnable parameters are relatively strongly correlated to a distribution of the training image samples. The following formula may be used to express a forward conduction procedure of the BN layer:

$$y = \frac{\lambda(x-\mu)}{\sigma} + \beta$$

$\beta$ and $\lambda$ represent learning parameters, $\mu$ represents an average value of training image samples, $\sigma$ represents a variance of the training image samples, x represents the training image sample, and y represents an output. $\beta$ and $\lambda$ are obtained by performing, based on the training image sample, iterative learning by using an optimization algorithm. A learning procedure is to minimize the loss function by adjusting the parameters (or maximizing when the loss is negative).

Therefore, in an example embodiment of the disclosure, a regular term of the loss function may be generated according to $\beta$ and $\lambda$, and the regular term may be added to an original loss function (that is, classification loss) of the residual network, to improve a generalization capability of the residual network model. A quadratic sum of $\beta$ and $\lambda$ may be calculated, and an arithmetic average value of the quadratic sum may be used as the regular term (that is, $$\frac{\lambda^2 + \beta^2}{2})$$

of the original loss function. That is, in this embodiment of the disclosure, a calculation method of an L2 regular term implemented by using Tensorfow is used to calculate the regular term of the original loss function. It is found through an experiment that, because orders of magnitude of $\beta$ and $\lambda$ are normally greater than an order of magnitude of a weight of the convolutional layers of the residual network by one order of magnitude, when the regular term is added to the original loss function, a regular term coefficient set for the regular term is less than the order of magnitude of the weight, for example, less than the order of magnitude of the weight by one order of magnitude, to prevent the added regular term from causing relatively great impact on the original loss function.

Figure 7:
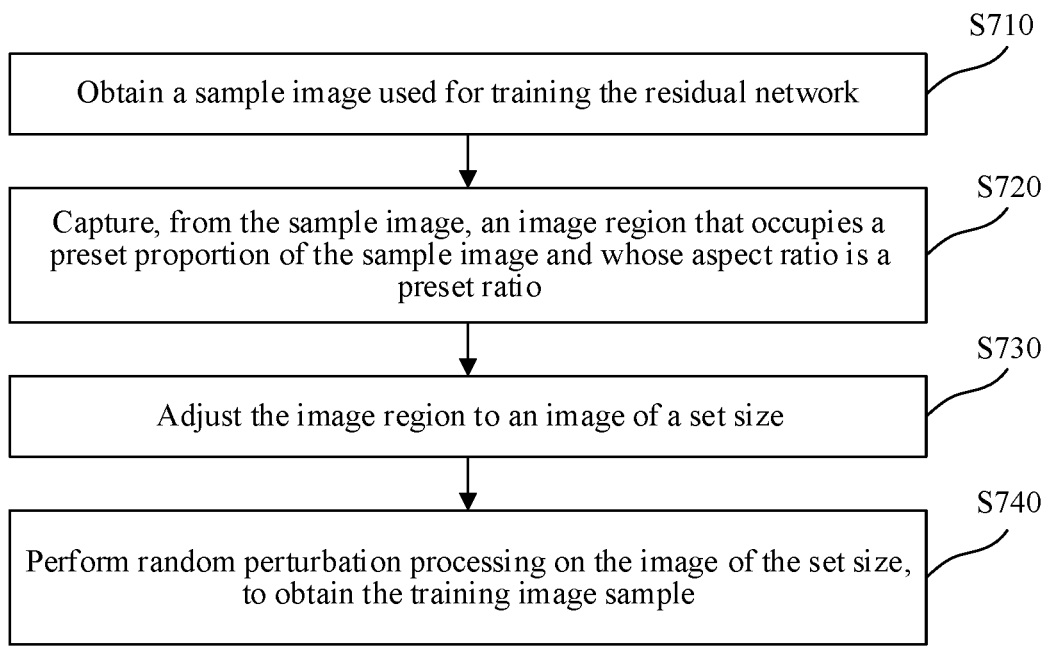
FIG. 7 shows a flowchart of obtaining a training sample image according to an example embodiment of the disclosure.

In an example embodiment of the disclosure, a technical solution for obtaining a training sample image is further provided. Specifically, as shown in FIG. 7, the following operations are included:

Operation S710: Obtain a sample image used for training the residual network.

In an example embodiment of the disclosure, the sample image may be an RGB image.

Operation S720: Capture, from the sample image, an image region that occupies a preset proportion of the sample image and whose aspect ratio is a preset ratio.

In the technical solution of this embodiment, a plurality of image regions may be captured from the sample image, and translation invariance and size invariance of the images obtained through capturing may be ensured.

In an example embodiment of the disclosure, the preset proportion is a value randomly selected from a preset proportion interval (or a preset proportion range), and/or the preset ratio is a value randomly selected from a preset aspect ratio interval (or a preset aspect ratio range). For example, the preset proportion interval may be [0.05, 1.0], and the preset aspect ratio interval may be [3/4, 4/3].

Operation S730: Adjust the image region to an image of a set size.

In this embodiment, the image region is adjusted to an image region of a set size, so that when the residual network is trained, images of the same size may be inputted into the network for training.

Operation S740: Perform random perturbation processing on the image of the set size, to obtain the training image sample.

In an example embodiment of the disclosure, the performing random perturbation processing on the image of the set size includes: horizontally flipping the image of the set size with a first processing probability; and/or rotating on the image of the set size by a random angle with a second processing probability, the random angle being a value randomly selected from a preset angle interval (or a preset angle range); and/or adjusting attributes of the image of the set size with a third processing probability. The attributes of the image include saturation, contrast, luminance, chrominance, and the like.

Through the technical solution of the embodiment shown in FIG. 7, whether to process the image may be selected based on a specified probability, thereby further preventing relatively great noise impact caused by excessively introduced data perturbation while increasing differences between training data.

Figure 8:
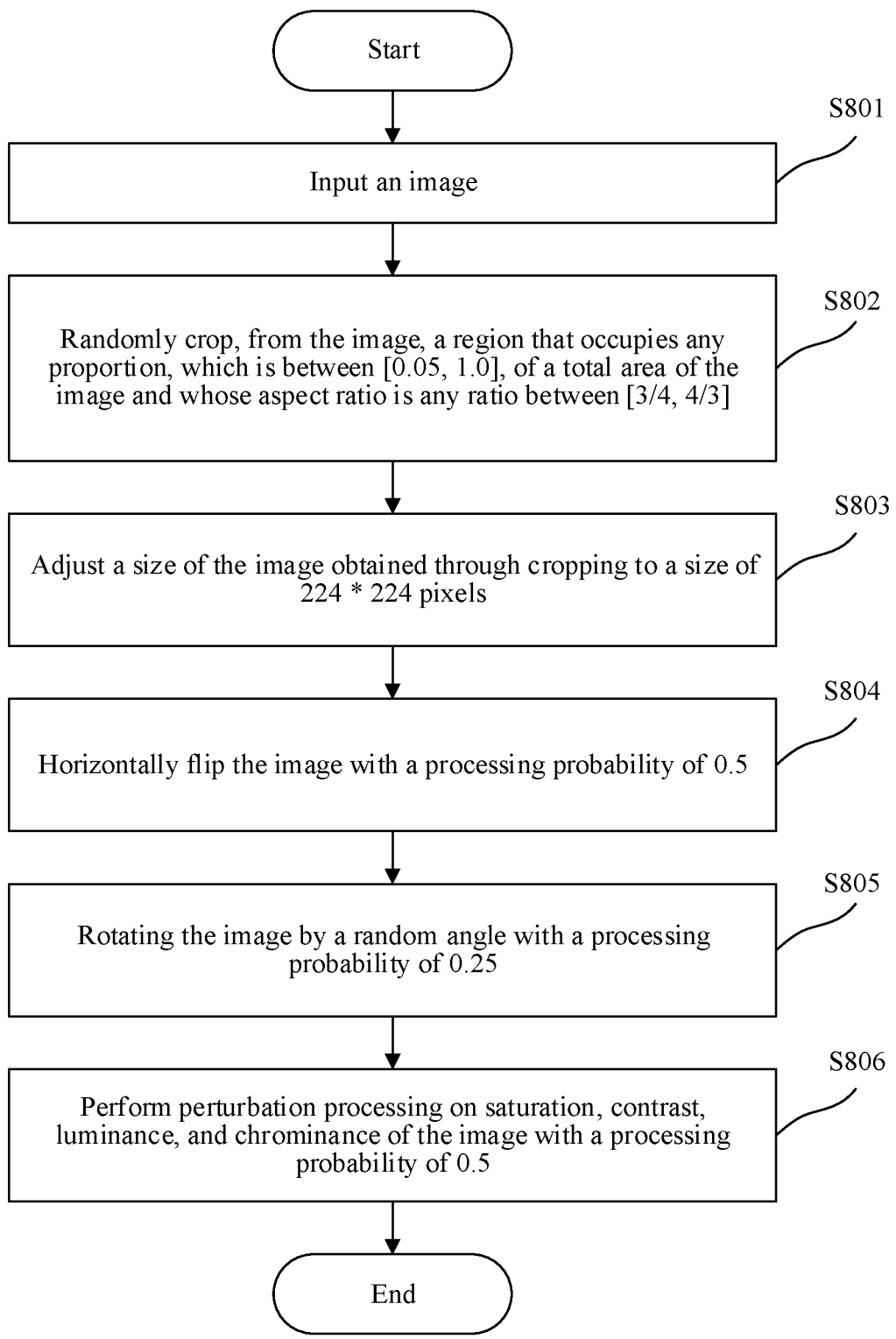
FIG. 8 shows a flowchart of performing perturbation processing on an image according to an example embodiment of the disclosure.

In a specific embodiment of the disclosure, as shown in FIG. 8, this embodiment shows a procedure of performing perturbation processing on an image, and the procedure specifically includes:

Operation S801: Input an image. The image may be an RGB image.

Operation S802: Randomly crop, from the image, a region that occupies any proportion, which is between [0.05, 1.0], of a total area of the image and whose aspect ratio is any ratio between [3/4, 4/3].

Operation S803: Adjust a size of the image obtained through cropping to a size of 224×224 pixels.

Operation S804: Horizontally flip the image with a processing probability of 0.5.

Operation S805: Rotating the image by a random angle with a processing probability of 0.25.

Operation S806: Perform perturbation processing on saturation, contrast, luminance, and chrominance of the image with a processing probability of 0.5.

The specific values shown in FIG. 8 are only examples. Processing sequences of operation S804 to operation S806 are not strictly required, that is, the operations may be performed in a reversed sequence, or the operations may be simultaneously performed.

Through the structure of the residual network provided in the foregoing embodiments of the disclosure, a currently optimal effect may be achieved. Details are shown in Table 2:

TABLE 2

| Model | Frame | Top1 Acc (%) | Top5 Error (%) |
|---|---|---|---|
| ResNet 101 | Tensorflow | 78.22 | 94.00 |
| ResNet 152 | Tensorflow | 78.94 | 94.44 |

The technical solutions of the foregoing embodiments of the disclosure may be widely applied to vision-related services, for example, may be used for evaluation and recommendation of image quality, object recognition in a game scene, image understanding, or video understanding.

The following describes an apparatus embodiment of the disclosure, which may be used for performing the image processing method in the foregoing embodiments of the disclosure. For details not disclosed in the apparatus embodiment of the disclosure, refer to the foregoing embodiments of the image processing method of the disclosure.

Figure 9:
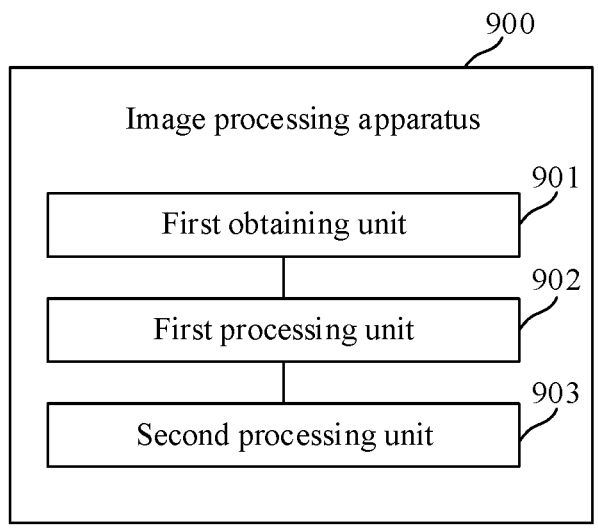
FIG. 9 schematically shows a block diagram of an image processing apparatus according to an example embodiment of the disclosure.

FIG. 9 schematically shows a block diagram of an image processing apparatus according to an example embodiment of the disclosure.

Referring to FIG. 9, an image processing apparatus 900 according to an example embodiment of the disclosure includes: a first obtaining unit 901, a first processing unit 902, and a second processing unit 903.

The first obtaining unit 901 is configured to obtain a to-be-processed target image; the first processing unit 902 is configured to perform feature extraction on the target image based on a residual network, to obtain image feature information, the residual network including a plurality of residual blocks that are successively connected, each of the residual blocks including a convolution branch and a residual branch, a size of a convolution kernel of a first convolutional layer in the convolution branch being less than a size of a convolution kernel of a second convolutional layer located after the first convolutional layer, and a convolution stride of the second convolutional layer being greater than a convolution stride of the first convolutional layer and less than a width of the convolution kernel of the second convolutional layer; and the second processing unit 903 is configured to perform recognition processing on the to-be-processed target image according to the image feature information.

In some embodiments of the disclosure, based on the foregoing solution, the residual network further includes an initial convolutional layer located before the plurality of residual blocks, and an output of the initial convolutional layer is used as an input of the first residual block in the plurality of residual blocks.

In some embodiments of the disclosure, based on the foregoing solution, the plurality of residual blocks form a plurality of convolution stages, and the residual branch included in the first residual block in each of the convolution stages includes a batch normalization processing layer and a target convolutional layer that are successively connected.

In some embodiments of the disclosure, based on the foregoing solution, the convolution branch further includes a third convolutional layer, the first convolutional layer, the second convolutional layer, and the third convolutional layer being successively connected, where the size of the convolution kernel of the first convolutional layer and a size of a convolution kernel of the third convolutional layer are 1×1 pixel, the convolution stride of the first convolutional layer and a convolution stride of the third convolutional layer are 1 pixel, the size of the convolution kernel of the second convolutional layer is 3×3 pixels, and the convolution stride of the second convolutional layer is 2 pixels.

In some embodiments of the disclosure, based on the foregoing solution, a batch normalization processing layer is set before each of the first convolutional layer, the second convolutional layer, and the third convolutional layer.

Figure 10:
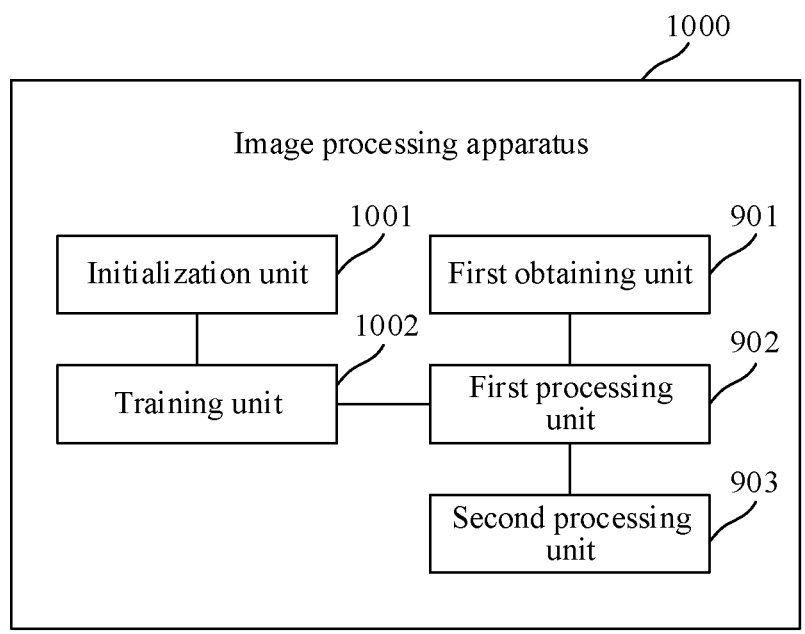
FIG. 10 schematically shows a block diagram of an image processing apparatus according to another example embodiment of the disclosure.

FIG. 10 schematically shows a block diagram of an image processing apparatus according to another example embodiment of the disclosure.

Referring to FIG. 10, an image processing apparatus 1000 according to another example embodiment of the disclosure further includes: an initialization unit 1001 and a training unit 1002 that are based on the first obtaining unit 901, the first processing unit 902, and the second processing unit 903 shown in FIG. 9.

The initialization unit 1001 is configured to initialize the residual network; and the training unit 1002 is configured to input a training image sample into the residual network to perform iterative training until a loss function of the residual network satisfies a convergence condition.

Figure 11:
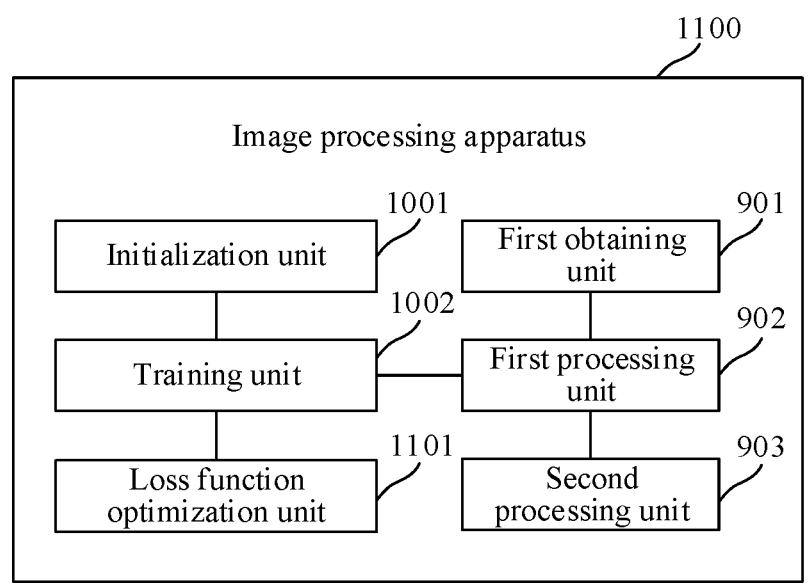
FIG. 11 schematically shows a block diagram of an image processing apparatus according to still another example embodiment of the disclosure.

FIG. 11 schematically shows a block diagram of an image processing apparatus according to still another example embodiment of the disclosure.

Referring to FIG. 11, an image processing apparatus 1100 according to still another example embodiment of the disclosure further includes: a loss function optimization unit 1101 based on the image processing apparatus shown in FIG. 10. The loss function optimization unit 1101 is configured to obtain learning parameters included in the batch normalization processing layer in the residual network; and generate a regular term of the loss function through the learning parameters, and add the regular term to the loss function.

In some embodiments of the disclosure, based on the foregoing solution, the loss function optimization unit 1101 is configured to determine a coefficient of the regular term, an order of magnitude of the coefficient of the regular term being less than an order of magnitude of a weight of the convolutional layers included in the residual network; and add the regular term to the loss function based on the coefficient of the regular term.

In some embodiments of the disclosure, based on the foregoing solution, the loss function optimization unit 1101 is configured to calculate a quadratic sum of the learning parameters, and use an arithmetic average value of the quadratic sum as the regular term of the loss function.

In some embodiments of the disclosure, based on the foregoing solution, the image processing apparatus shown in FIG. 10 and FIG. 11 may further include: a second obtaining unit (not shown), configured to obtain a sample image used for training the residual network; a capturing unit (not shown), configured to capture, from the sample image, an image region that occupies a preset proportion of the sample image and whose aspect ratio is a preset ratio; a size adjustment unit (not shown), configured to adjust the image region to an image of a set size; and a perturbation processing unit, configured to perform random perturbation processing on the image of the set size, to obtain the training image sample.

In some embodiments of the disclosure, based on the foregoing solution, the preset proportion is a value randomly selected from a preset proportion interval, and/or the preset ratio is a value randomly selected from a preset aspect ratio interval.

In some embodiments of the disclosure, based on the foregoing solution, the perturbation processing unit is configured to horizontally flip the image of the set size with a first processing probability; and/or rotating the image of the set size by a random angle with a second processing probability, the random angle being a value randomly selected from a preset angle interval; and/or adjust attributes of the image of the set size with a third processing probability.

Even if a plurality of modules or units of a device configured to perform actions are provided in the foregoing detailed descriptions, the disclosure is not limited thereto. According to the embodiments of the disclosure, the features and functions of the two or more modules or units described above may be embodied in one module or unit. Reversely, the features and functions of one module or unit described above may be further divided into a plurality of modules or units.

Through the description of the foregoing implementations, a person skilled in the art may easily understand that the example implementations described herein may be implemented by software or through a manner of combining software with necessary hardware. Therefore, the technical solutions of the embodiments of the disclosure may be implemented in the form of a software product. The software product may be stored in a non-volatile storage medium (which may include a CD-ROM, a USB flash drive, a removable hard disk, or the like) or a network, and includes several instructions for instructing a computer device (which may be a personal computer, a server, a network device, or the like) to perform the methods of the implementations of the disclosure.

After considering the specification and practicing the present disclosure, a person skilled in the art would easily conceive of other implementations of the disclosure. The disclosure is intended to cover any variation, use, or adaptive change of the disclosure. These variations, uses, or adaptive changes follow the general principles of the disclosure and include common general knowledge or common technical means in the art that are not disclosed in the disclosure. The specification and the embodiments are considered as merely examples, and the real scope and spirit of the disclosure are pointed out in the following claims.

It is to be understood that the disclosure is not limited to the precise structures described above and shown in the accompanying drawings, and various modifications and changes can be made without departing from the scope of the disclosure. The scope of the disclosure is subject only to the appended claims.

What is claimed is:

1. An image processing method, performed by an electronic device, the method comprising:
   obtaining a target image;
   performing feature extraction on the target image based on a residual network, to obtain image feature information, the residual network comprising a plurality of residual blocks that are successively connected, each of the plurality of residual blocks comprising a convolution branch and a residual branch, a size of a convolution kernel of a first convolutional layer in the convolution branch being less than a size of a convolution kernel of a second convolutional layer located after the first convolutional layer, and a convolution stride of the second convolutional layer being greater than a convolution stride of the first convolutional layer and less than a width of the convolution kernel of the second convolutional layer; and
   performing recognition processing on the target image based on the image feature information,
   wherein the method further comprises: prior to the performing the feature extraction,
   capturing, from a sample image, an image region that occupies a preset proportion of the sample image and whose aspect ratio is a preset ratio;
   adjusting the image region to an image of a set size;
   performing random perturbation processing on the image of the set size, to obtain a training image sample; and
   training the residual network by using the training image sample.

2. The image processing method according to claim 1, wherein the residual network further comprises an initial convolutional layer located before the plurality of residual blocks, and an output of the initial convolutional layer is used as an input of a first residual block in the plurality of residual blocks.

3. The image processing method according to claim 1, wherein the plurality of residual blocks form a plurality of convolution stages, and the residual branch included in a first residual block in each of the plurality of convolution stages comprises a batch normalization processing layer and a target convolutional layer that are successively connected.

4. The image processing method according to claim 1, wherein the convolution branch further comprises a third convolutional layer, wherein the first convolutional layer, the second convolutional layer, and the third convolutional layer are successively connected, and
   wherein the size of the convolution kernel of the first convolutional layer and a size of a convolution kernel of the third convolutional layer are 1×1 pixel, the convolution stride of the first convolutional layer and a convolution stride of the third convolutional layer are 1 pixel, the size of the convolution kernel of the second convolutional layer is 3×3 pixels, and the convolution stride of the second convolutional layer is 2 pixels.

5. The image processing method according to claim 4, wherein a batch normalization processing layer is set before each of the first convolutional layer, the second convolutional layer, and the third convolutional layer.

6. The image processing method according to claim 1, wherein the training the residual network comprises:
   initializing the residual network; and
   inputting the training image sample into the residual network to perform iterative training until a loss function of the residual network satisfies a convergence condition.

7. The image processing method according to claim 6, further comprising:
   obtaining learning parameters included in a batch normalization processing layer in the residual network;
   generating a regular term of the loss function through the learning parameters; and
   adding the regular term to the loss function.

8. The image processing method according to claim 7, wherein the adding comprises:
   determining a coefficient of the regular term, an order of a magnitude of the coefficient of the regular term being less than an order of a magnitude of a weight of convolutional layers included in the residual network; and
   adding the regular term to the loss function based on the coefficient of the regular term.

9. The image processing method according to claim 7, wherein the generating comprises:

calculating a quadratic sum of the learning parameters; and generating the regular term of the loss function based on an arithmetic average value of the quadratic sum.

10. The image processing method according to claim 1, wherein at least one of the preset proportion and the preset ratio has a value that is randomly selected from a preset range.

11. The image processing method according to claim 1, wherein the performing the random perturbation processing on the image of the set size comprises at least one of:

horizontally flipping the image of the set size with a first processing probability;

rotating the image of the set size by a random angle with a second processing probability, the random angle being a value randomly selected from a preset angle range; and adjusting attributes of the image of the set size with a third processing probability.

12. An image processing apparatus, comprising:

at least one memory configured to store program code; and at least one processor configured to read the program code and operate as instructed by the program code, the program code comprising:

first obtaining code configured to cause at least one of the at least one processor to obtain a target image;

first processing code configured to cause at least one of the at least one processor to perform feature extraction on the target image based on a residual network, to obtain image feature information, the residual network comprising a plurality of residual blocks that are successively connected, each of the plurality of residual blocks comprising a convolution branch and a residual branch, a size of a convolution kernel of a first convolutional layer in the convolution branch being less than a size of a convolution kernel of a second convolutional layer located after the first convolutional layer, and a convolution stride of the second convolutional layer being greater than a convolution stride of the first convolutional layer and less than a width of the convolution kernel of the second convolutional layer; and second processing code configured to cause at least one of the at least one processor to perform recognition processing on the target image based on the image feature information;

wherein the residual network performs, prior to the performing the feature extraction, training using a training image sample, and wherein the training image sample is obtained by:

capturing, from a sample image, an image region that occupies a preset proportion of the sample image and whose aspect ratio is a preset ratio;

adjusting the image region to an image of a set size; and performing random perturbation processing on the image of the set size.

13. The image processing apparatus according to claim 12, wherein the residual network further comprises an initial convolutional layer located before the plurality of residual blocks, and an output of the initial convolutional layer is used as an input of a first residual block in the plurality of residual blocks.

14. The image processing apparatus according to claim 12, wherein the plurality of residual blocks form a plurality of convolution stages, and the residual branch included in a first residual block in each of the plurality of convolution stages comprises a batch normalization processing layer and a target convolutional layer that are successively connected.

15. The image processing apparatus according to claim 12, wherein the convolution branch further comprises a third convolutional layer, wherein the first convolutional layer, the second convolutional layer, and the third convolutional layer are successively connected, and wherein the size of the convolution kernel of the first convolutional layer and a size of a convolution kernel of the third convolutional layer are 1×1 pixel, the convolution stride of the first convolutional layer and a convolution stride of the third convolutional layer are 1 pixel, the size of the convolution kernel of the second convolutional layer is 3×3 pixels, and the convolution stride of the second convolutional layer is 2 pixels.

16. The image processing apparatus according to claim 15, wherein a batch normalization processing layer is set before each of the first convolutional layer, the second convolutional layer, and the third convolutional layer.

17. The image processing apparatus according to claim 12, wherein the residual network performs iterative training by using the training image sample input to the residual network until a loss function of the residual network satisfies a convergence condition.

18. A non-transitory computer-readable medium, storing a computer program, the computer program, when executed by at least one processor, causing the at least one processor to perform:

obtaining a target image;

performing feature extraction on the target image based on a residual network, to obtain image feature information, the residual network comprising a plurality of residual blocks that are successively connected, each of the plurality of residual blocks comprising a convolution branch and a residual branch, a size of a convolution kernel of a first convolutional layer in the convolution branch being less than a size of a convolution kernel of a second convolutional layer located after the first convolutional layer, and a convolution stride of the second convolutional layer being greater than a convolution stride of the first convolutional layer and less than a width of the convolution kernel of the second convolutional layer; and performing recognition processing on the target image based on the image feature information, wherein the computer program, when executed by the at least one processor, further causes the at least one processor to perform: prior to the performing the feature extraction, capturing, from a sample image, an image region that occupies a preset proportion of the sample image and whose aspect ratio is a preset ratio;

adjusting the image region to an image of a set size;

performing random perturbation processing on the image of the set size, to obtain a training image sample; and training the residual network by using the training image sample.

19. The image processing method according to claim 1, wherein the electronic device comprises:

one or more processors; and a storage apparatus, configured to store one or more programs, the one or more programs, when executed by the one or more processors, causing the one or more processors to perform the method according to claim 1.

* * * * *